US008033806B2

(12) United States Patent
Yoon et al.

(10) Patent No.: US 8,033,806 B2
(45) Date of Patent: Oct. 11, 2011

(54) APPARATUS FOR MANUFACTURING SECONDARY BATTERY

(75) Inventors: Junill Yoon, Seoul (KR); Ji Hoon Han, Daejeon (KR); Heekook Yang, Daejeon (KR)

(73) Assignee: LG Chem, Ltd. (KR)

( * ) Notice: Subject to any disclaimer, the term of this patent is extended or adjusted under 35 U.S.C. 154(b) by 1250 days.

(21) Appl. No.: 11/517,741

(22) Filed: Sep. 8, 2006

(65) Prior Publication Data

US 2007/0154799 A1 Jul. 5, 2007

(30) Foreign Application Priority Data

Sep. 28, 2005 (KR) ........................ 10-2005-0090241

(51) Int. Cl.
*B29C 70/76* (2006.01)

(52) U.S. Cl. ........................... 425/89; 425/116; 425/125

(58) Field of Classification Search .................... 425/89, 425/116, 125, 129.1, DIG. 44; 249/83, 91, 249/95
See application file for complete search history.

(56) References Cited

U.S. PATENT DOCUMENTS 4,076,791 A * 2/1978 Barter et al. ............. 264/272.15
4,626,185 A * 12/1986 Monnet ......................... 425/110
4,738,813 A * 4/1988 Finkensiep .................... 264/275
4,999,147 A * 3/1991 Kojima et al. ................ 264/139
6,100,114 A * 8/2000 Milkovich et al. ............ 438/127
7,241,414 B2 * 7/2007 Ho et al. .................. 264/272.17
2004/0023095 A1 * 2/2004 Middelman et al. ............ 429/34
2004/0170893 A1 * 9/2004 Nakaishi et al. .............. 429/185
2006/0127756 A1 6/2006 Seo
2006/0234119 A1 * 10/2006 Kruger et al. ................. 429/160
2006/0286450 A1 * 12/2006 Yoon et al. .................... 429/180

FOREIGN PATENT DOCUMENTS

JP 10004207 A * 1/1998
JP 11176400 A * 7/1999
KR 1020060126106 12/2006
WO 2005031897 4/2005
WO 2005/074054 A1 8/2005
WO WO 2006038697 A1 * 4/2006

* cited by examiner

*Primary Examiner* — Robert B Davis
(74) *Attorney, Agent, or Firm* — Cantor Colburn LLP

(57) ABSTRACT

Disclosed herein is an apparatus for manufacturing a secondary battery by performing insert injection molding with respect to a portion of a battery cell while the battery cell is located in a mold, wherein the apparatus comprises a pair of upper and lower molds, at which are formed shapes corresponding to the battery cell, the upper and lower molds are provided at the inside surfaces thereof with elastic members, and the elastic members are constructed in a structure in which the elastic members support a cell body of the battery cell and isolate a non-molding region from a molding region while the battery cell is mounted in the upper and lower molds. The secondary battery manufacturing apparatus according to the present invention has the effect of preventing a battery case from being damaged due to the contact between the battery case and the mold when the mold is brought into tight contact with the cell body of the battery cell during insert injection molding to form a molding member at a specific region of the secondary battery, and effectively preventing a material for insert injection molding, which is injected into the molding region, from being injected into the non-molding region.

3 Claims, 7 Drawing Sheets

320
360
310
A
320
330
A
350
340

Prior Art

APPARATUS FOR MANUFACTURING SECONDARY BATTERY

FIELD OF THE INVENTION

The present invention relates to an apparatus for manufacturing a secondary battery, and, more particularly, to an apparatus for manufacturing a secondary battery by performing insert injection molding with respect to a portion of a battery cell while the battery cell is located in a mold, wherein the apparatus comprises a pair of upper and lower molds, at which are formed shapes corresponding to the battery cell, the upper and lower molds are provided at the inside surfaces thereof with elastic members, and the elastic members are constructed in a structure in which the elastic members support a cell body of the battery cell and isolate a non-molding region from a molding region while the battery cell is mounted in the upper and lower molds.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery pack having a plurality of battery cells electrically connected with each other because high output and large capacity is necessary for the medium- or large-sized devices.

Preferably, the medium- or large-sized battery pack is manufactured with small size and small weight if possible. For this reason, a rectangular battery or a pouch-shaped battery, which can be stacked with high integration and has a small weight to capacity ratio, is usually used as a battery cell of the medium- or large-sized battery pack. Especially, much interest is currently generated in the pouch-shaped battery, which uses an aluminum laminate sheet as a battery case.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper end and the lower end of a battery cell 13, respectively, while the electrode leads 11 and 12 are opposite to each other. A battery case 14 comprises upper and lower battery case parts. That is, the battery case 14 is a two-unit case. An electrode assembly (not shown) is received in a receiving part 15, which is defined between the upper and lower battery case parts of the battery case 14. The opposite sides 14*a* and upper and lower ends 14*b* and 14*c*, which are contact regions of the upper and lower battery case parts of the battery case 14, are bonded to each other, whereby the pouch-shaped battery 10 is manufactured. The battery case 14 is constructed in a laminate structure of a resin layer/a metal film layer/a resin layer. Consequently, it is possible to bond the opposite sides 14*a* and upper and lower ends 14*b* and 14*c* of the upper and lower battery case parts of the battery case 14, which are in contact with each other, to each other by applying heat and pressure to the opposite sides 14*a* and upper and lower ends 14*b* and 14*c* of the upper and lower battery case parts of the battery case 14 so as to weld the resin layers to each other. According to circumstances, the opposite sides 14*a* and upper and lower ends 14*b* and 14*c* of the upper and lower battery case parts of the battery case 14 may be bonded to each other using a bonding agent. For the opposite sides 14*a* of the battery case 14, the same resin layers of the upper and lower battery case parts of the battery case 14 are in direct contact with each other, whereby uniform sealing at the opposite sides 14*a* of the battery case 14 is accomplished by welding. For the upper and lower ends 14*b* and 14*c* of the battery case 14, on the other hand, the electrode leads 11 and 12 protrude from the upper and lower ends 14*b* and 14*c* of the battery case 14. For this reason, the upper and lower ends 14*b* and 14*c* of the upper and lower battery case parts of the battery case 14 are thermally welded to each other, while a film-shaped sealing member 16 is interposed between the electrode leads 11 and 12 and the battery case 14, in consideration of the thickness of the electrode leads 11 and 12 and the difference in material between the electrode leads 11 and 12 and the battery case 14, so as to increase sealability.

In the pouch-shaped battery 10, however, the battery cell 13 repeatedly expands and contracts during the charge and the discharge of the pouch-shaped battery 10. As a result, the thermally welded regions of the upper and lower ends 14*b* and 14*c*, especially the opposite sides 14*a*, of the upper and lower battery case parts of the battery case 14, are easily separated from each other. Furthermore, the mechanical strength of the battery case 14 is low. In order to solve this problem, there have been proposed a method of applying an epoxy resin or a silicon resin to the outside sealing region of the battery case 14, and a method of mounting batteries in additional members having sufficient mechanical strength, respectively, and stacking the additional members one on another.

However, the above-mentioned methods do not provide high sealing force. Furthermore, when the above-mentioned methods are used, the total weight and the total size of the battery pack are increased, and the assembly process of the battery pack is very complicated.

In order to solve the above-mentioned problems, there has been proposed a secondary battery comprising an electrode assembly for charging and discharging mounted in a battery case including a metal layer and a resin layer, wherein a molding part having a predetermined thickness is at least partially formed at the outside of the battery case, which is disclosed in Korean Patent Application No. 2005-0047765, which has been filed in the name of the applicant of the present patent application. When the secondary battery is a thin-type battery, such as a pouch-shaped battery, the molding part increases the mechanical strength of the battery case, and further increases the sealing force at the sealing region. Furthermore, the molding part provides a stable stacking structure when a plurality of secondary batteries are stacked one on another so as to manufacture a medium- or large-sized battery pack.

In some small-sized secondary batteries as well as the above-described secondary battery, a cap assembly, such as a protection circuit, is integrally formed at the battery cell by insert injection molding. During the insert injection molding, a molding member is formed at a part or the entirety of the battery cell. At this time, the battery cell is brought into contact with a mold. However, the battery case of the battery may be damaged due to such contact. According to circumstances, short circuits may occur.

For example, when a molding member is formed at a specific region of the battery cell, it is necessary that the remaining parts of the battery cell be brought into tight contact with the mold, whereby injection of a material for insert injection molding (e.g., a molten material) is prevented. To this end, the mold and the corresponding region of the battery cell must be brought into tight contact with each other with a high sealing force. During this procedure, however, the battery case may be damaged. The damage to the battery case causes leakage of an electrolyte from the battery cell. Especially in a medium- or large-sized battery pack, in which a plurality of unit cells are stacked one on another, this may cause a serious accident.

SUMMARY OF THE INVENTION

Therefore, the present invention has been made to solve the above problems, and other technical problems that have yet to be resolved.

Specifically, it is an object of the present invention to provide an apparatus for manufacturing a secondary battery that is capable of preventing a battery case from being damaged when a mold is brought into tight contact with a battery cell of the secondary battery during insert injection molding to form a molding member at a specific region of the secondary battery.

It is another object of the present invention to provide a secondary battery, having a specific shape, manufactured by the above-described apparatus.

In accordance with one aspect of the present invention, the above and other objects can be accomplished by the provision of an apparatus for manufacturing a secondary battery by performing insert injection molding with respect to a portion of a battery cell while the battery cell is located in a mold, wherein the apparatus comprises a pair of upper and lower molds, at which are formed shapes corresponding to the battery cell, the upper and lower molds are provided at the inside surfaces thereof with elastic members, and the elastic members are constructed in a structure in which the elastic members support a cell body of the battery cell and isolate a non-molding region from a molding region while the battery cell is mounted in the upper and lower molds.

In the secondary battery manufacturing apparatus according to the present invention, the cell body of the battery cell is supported by the elastic members during the insert injection molding process. Consequently, the damage to the battery case due to the direct contact between the battery case and the mold is prevented, and injection of a material for insert injection molding from a specific region where a molding member is formed ("molding region") to other region ("non-molding region) is effectively prevented due to a high contact force of the elastic members in spite of low pressure.

Preferably, the battery cell according to the present invention is a thin-type secondary battery having a small thickness, and the battery cell has a battery case constructed in a laminate structure including a metal layer and a resin layer. A typical example of such a secondary battery is a so-called pouch-shaped battery using a laminate sheet made of aluminum and resin as a battery case. The battery case of the pouch-shaped battery may be constructed in various structures. For example, the sheathing member of the pouch-shaped battery may be constructed in a structure in which an electrode assembly is received in a receiving part formed at the upper inner surface and/or the lower inner surface of a one-unit folding type member, and the upper and lower contact regions are sealed or in a structure in which an electrode assembly is received in a receiving part formed at the upper inner surface and/or the lower inner surface of a two-unit member, and the upper and lower contact regions are sealed. A pouch-shaped battery with the above-stated structure is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises a cathode and an anode, by which the charge and the discharge of the battery are possible. The electrode assembly is constructed in a structure in which the cathode and the anode are stacked while a separator is disposed between the cathode and the anode. For example, the electrode assembly is constructed in a jelly-roll type structure or in a stack type structure. The cathode and the anode of the electrode assembly may be constructed such that an electrode tap of the cathode and an electrode tap of the anode directly protrude outward from the battery. Alternatively, the cathode and the anode of the electrode assembly may be constructed such that the electrode tap of the cathode and the electrode tap of the anode are connected to additional electrode leads, and the electrode leads protrude outward from the battery. The protruding direction of the electrode taps or the electrode leads is not particularly restricted. For example, the electrode taps or the electrode leads may protrude together from the upper end of the battery, the electrode taps or the electrode leads may protrude from the upper and lower ends of the battery, respectively, while the electrode taps or the electrode leads are opposite to each other, or the electrode taps or the electrode leads may protrude from the upper end and the side of the battery, respectively, such that the electrode taps or the electrode leads are perpendicular to each other.

The region where the molding member is formed by the insert injection molding (the molding region) may be varied depending upon the structure of the battery cell. For example, the molding region may be a cap assembly region including a protection circuit mounted to the upper end of the cell body of the battery cell. In this case, the cap assembly is formed integrally with a portion (for example, the upper end of the battery cell and the region adjacent to the upper end of the battery cell) of the outer surface of the battery cell or the entire outer surface of the battery cell.

As another example, the molding region formed by the insert injection molding may be an outside sealing region of the battery case. A molding part having a predetermined thickness may be formed at the sealing region by the insert injection molding. The molding part increases the mechanical strength of the battery case and the sealing force at the sealing region. Furthermore, the molding part provides structural stability when a plurality of secondary batteries are stacked one on another so as to manufacture a medium- or large-sized battery pack. The details of a secondary battery including such a molding part is disclosed in Korean Patent Application No. 2005-0047765, which has been filed in the name of the applicant of the present patent application. The disclosure of the above-mentioned patent application is hereby incorporated by reference as if fully set forth herein.

A material for filling the molding region is not particularly restricted so long as the material for filling the molding region is a liquid-phase material that can be used for the insert injection molding. For example, the material for filling the molding region may be a molten thermoplastic polymer, a thermosetting and/or ultraviolet-setting solution, or a liquid-phase dehydration-setting compound. In the case that the material for filling the molding region is a liquid-phase material, the material for filling the molding region may be provided in various states, such as monomer, oligomer, paste, and molten polymer. According to circumstances, filler, such as reinforcing fiber, for increasing strength may be further contained in the material for filling the molding region.

The elastic members serve to support the cell body of the battery cell, and, at the same time, prevent injection of the material for insert injection molding from the molding region to other region ("non-molding region). To this end, the elastic members are formed in the inside surfaces of the mold such that the elastic members come into contact with the cell body of the battery cell while the elastic members surround the molding region. Preferably, the elastic members are formed in the inside surfaces of the upper and lower molds. The elastic members may be formed at the other region excluding the molding region, i.e., at the entirety of the non-molding region, or may be formed along the outer circumference surface of the non-molding region, with which the molding region is in contact.

When the upper and lower molds come into tight contact with each other while the battery cell is mounted in the upper and lower molds, the cell body of the battery cell is supported by the elastic members inside the mold, and the molding region is left empty. At the mold are formed injection ports, through which the material for insert injection molding is injected to the molding region, whereby the insert injection molding is carried out.

The elastic members are not particularly restricted so long as the elastic members are made of a material that can provide a flexibly elastic force. For example, the elastic members may be made of natural rubber or synthetic rubber. According to circumstances, the elastic members may be covered with an inactive protection film for protecting the elastic members from the material for insert injection molding.

In accordance with another aspect of the present invention, there is provided a secondary battery manufactured by the secondary battery manufacturing apparatus with the above-stated construction.

The secondary battery according to the present invention is a battery having a molding member at least partially formed by insert injection molding. Preferably, the secondary battery according to the present invention may be a pouch-shaped battery including a molding part, having a predetermined thickness, formed at an outside sealing region of the battery cell such that the secondary battery can be used as a unit cell for medium- or large-sized battery pack, as previously described.

Preferably, the molding part is at least partially formed at the outside sealing region of the battery case. The molding part increases the mechanical strength of the battery case. Furthermore, the molding part increases the sealing force at the sealing region, thereby preventing permeation of moisture and leakage of an electrolyte. Generally, when the upper and lower battery cases constructed in the laminate structure are sealed with each other, the contact regions of the upper and lower battery cases are integrally attached to each other by applying heat and pressure to the contact regions of the upper and lower battery cases. Consequently, in the case that the molding part is formed at the sealing region such that the sealing region is wrapped by the molding part, the sealing force is further increased. In a preferred embodiment, the molding part may be formed at the opposite side sealing regions of the battery case. Alternatively, the molding part may be formed at the opposite side sealing regions, the upper end sealing region, and/or the lower end sealing region of the battery case. The molding part formed at the upper end sealing region and the lower end sealing region of the battery case serves to increase the sealing force of the pouch-shaped battery and to further increase the mechanical strength of the pouch-shaped battery.

Preferably, the molding part has a thickness greater than that of the cell body of the battery cell. In this case, batteries can be stably stacked one on another while the batteries are spaced a predetermined distance from each other due to the molding part. As a result, a shock-absorbing region for accepting the change in thickness of the cell body of the battery cell during the charge and discharge of the battery is formed, and, furthermore, a coolant flow channel for removing heat generated from the cell body of the battery cell during the charge and discharge of the battery is formed. The coolant is a material for accomplishing heat dissipation from the cell body of the battery cell. For example, the coolant may be air or liquid.

In a preferred embodiment, the molding part is formed along the entireties of the opposite side sealing regions of the battery case, and therefore, the structural stability is further improved when a plurality of secondary batteries are stack one on another so as to manufacture a medium- or large-sized battery pack. According to circumstances, the molding part may be formed along the entireties of the opposite side sealing regions of the battery case, and, at the same time, additional molding parts, which are identical to the above-described molding part, may be coupled to the upper end part and/or the lower end part of the battery case.

Although the molding part may be formed along the outside of the battery case such that the molding part has a predetermined thickness, the molding part may be provided with at least one depression having relatively small thickness, by which at least one uniform coolant flow channel is formed when a plurality of batteries are stacked one on another so as to manufacture a battery pack.

According to circumstances, one or more coupling parts, which are selected from a group consisting of a coupling step, a coupling groove, and a through-hole, may be formed at the molding part such that, when a plurality of secondary batteries are stack one on another so as to manufacture a medium- or large-sized battery pack, the coupling between the stacked batteries is more easily accomplished and/or the stacked batteries can be securely mounted to an interior member for the battery pack (e.g., a battery pack housing). The location of the coupling parts may be varied depending upon the coupling fashion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
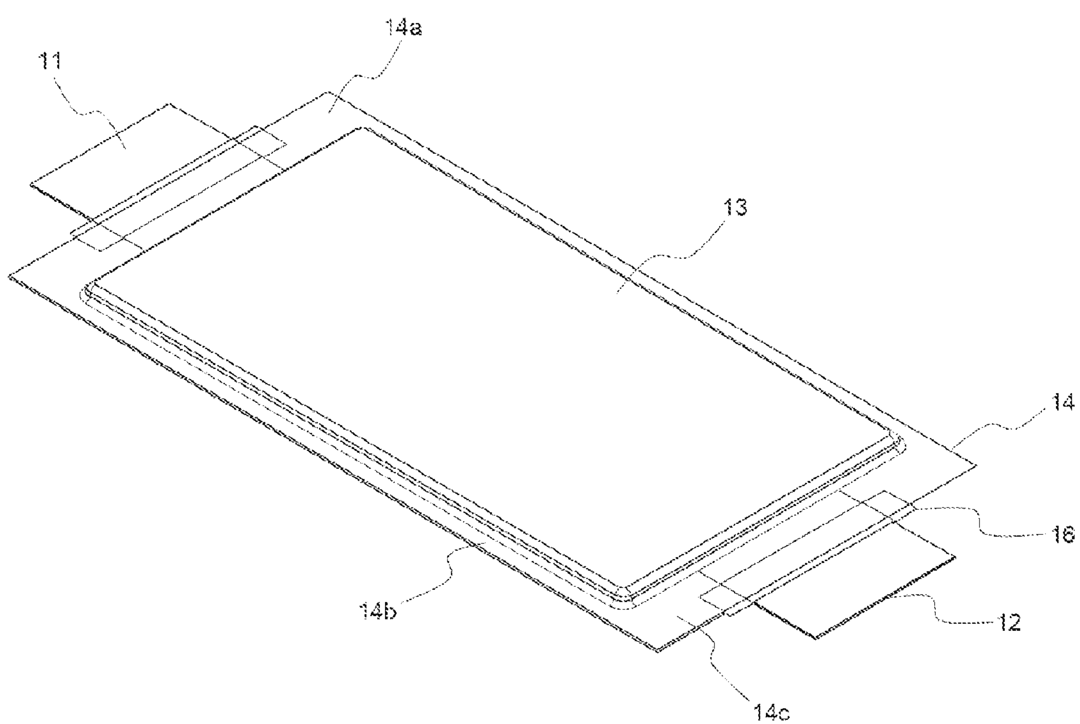
FIG. 1 is a perspective view illustrating a conventional representative pouch-shaped battery.
Figure 2:
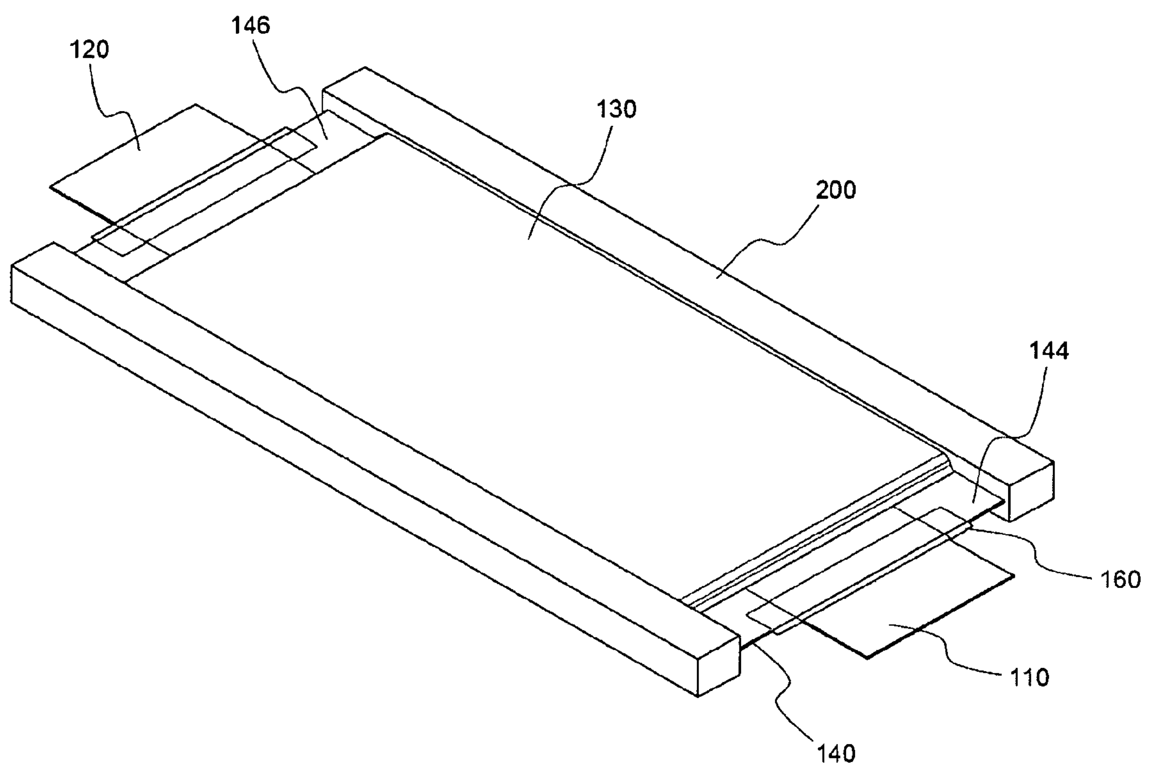
FIGS. 2 to 4 are perspective views illustrating secondary batteries according embodiments of the present invention, which can be manufactured using an apparatus according to the present invention.
Figure 3:
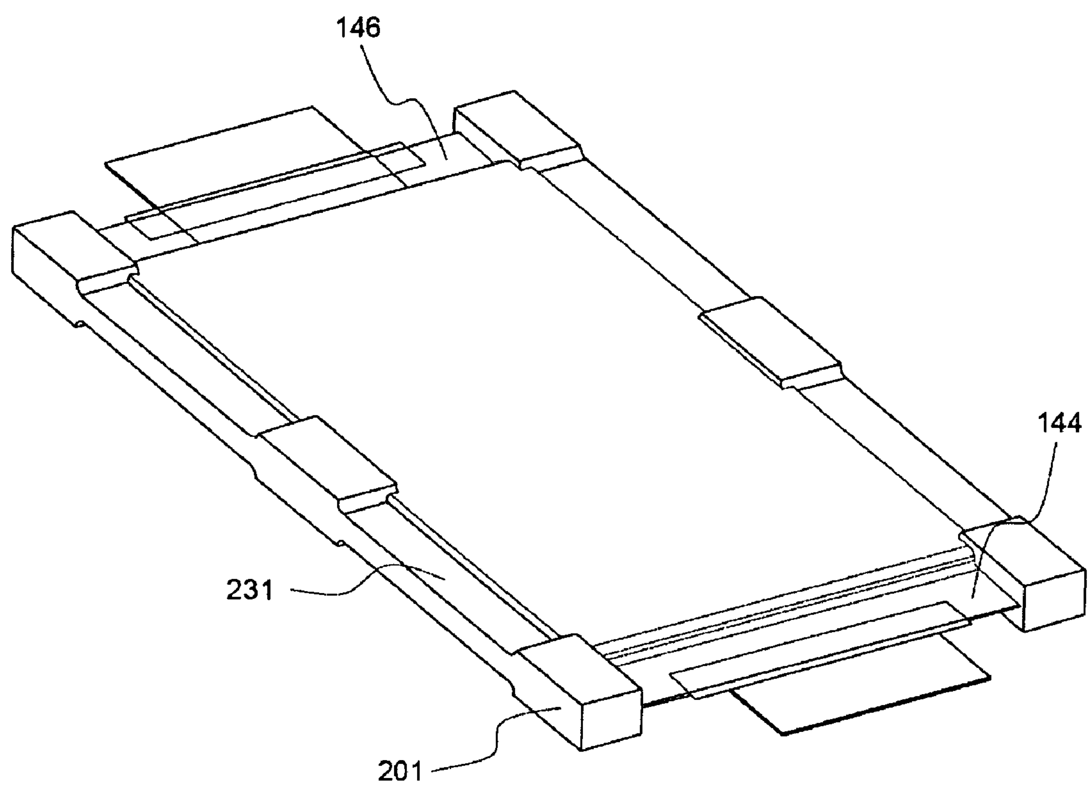
Figure 4:
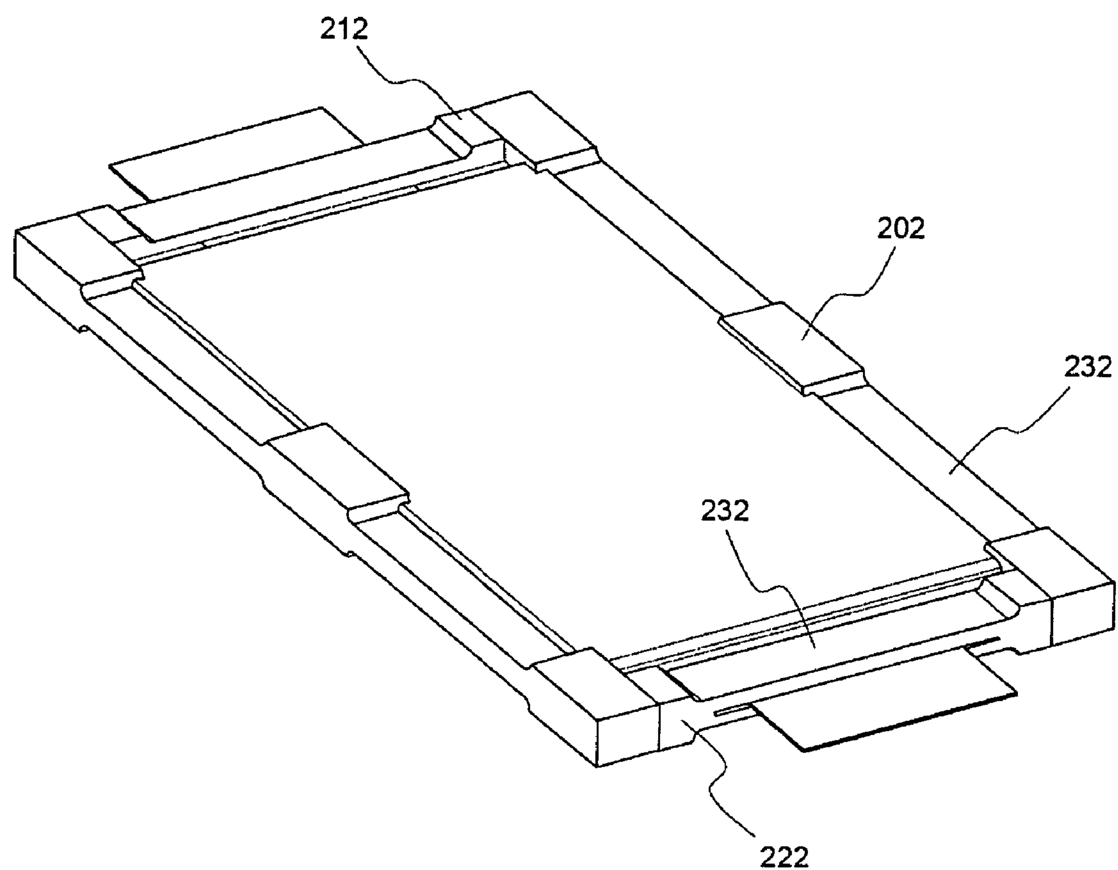

FIGS. 2 to 4 are perspective views illustrating secondary batteries according embodiments of the present invention, which can be manufactured using an apparatus according to the present invention.

Referring to FIG. 2, the secondary battery 100 is constructed such that the opposite sides, the upper end part 144, and the lower end part 146 are sealed while an electrode assembly (not shown) is mounted between a two-unit pouch-shaped battery case 140, and cathode and anode leads 110 and 120 protrude from the upper end and the lower end of the battery 100, respectively. Between the electrode leads 110 and 120 and the battery case 140 is interposed a film-shaped sealing member 160 for increasing sealability between the electrode leads 110 and 120 and the battery case 140. At the opposite side sealing regions of the battery 100 is formed a molding part 200 having a thickness slightly greater than that of the battery cell 130 such that the molding part uniformly extends along the entireties of the opposite sides of the battery cell 130. The side molding part 200 further increases a sealing force at the opposite side sealing regions, which are relatively weak, and, at the same time, increases the mechanical strength of the battery 100. Moreover, the molding part 200 serves as a frame when a plurality of secondary batteries 100 are stack one on another so as to manufacture a high-output, large-capacity medium- or large-sized battery pack.

Referring to FIG. 3, the secondary battery 101 shown in FIG. 3 is different from the secondary battery 100 shown in FIG. 2 in that a plurality of depressions 231 are formed at the side molding part 201. The depressions 231 means relatively thin regions of the side molding part 201. The number of the depressions 231 is not particularly restricted. When a plurality of secondary batteries 101, which serve as unit cells, are stacked one on another so as to form a medium- or large-sized battery pack (not shown), coolant flow channels are formed in the lateral direction of the secondary batteries due to the depressions 231 located at the opposite sides of the respective secondary batteries 101. On the other hand, no additional molding part is formed at the sealing regions of the upper end part 144 and the lower end part 146 of the secondary battery 101, and therefore, coolant flow channels, which are wider than the coolant flow channels formed in the lateral direction of the secondary batteries, are formed in the longitudinal direction of the secondary batteries.

Referring to FIG. 4, the secondary battery 102 shown in FIG. 4 is a modification of the secondary battery 101 shown in FIG. 3. Depressions 232 are formed at the upper and lower molding parts 212 and 222 of the secondary battery 102. When a plurality of secondary batteries 102, which serve as unit cells, are stacked one on another so as to form a medium- or large-sized battery pack (not shown), coolant flow channels are formed in the longitudinal direction of the secondary batteries due to the depressions 232 located at the upper and lower end parts of the respective secondary batteries 101 in the same manner as in the lateral direction of the secondary batteries.

The side molding parts 200, 201 and 202 and the upper end and lower end molding parts 212 and 222 of the secondary batteries 100, 101, and 102 shown in FIGS. 2 to 4 are a kind of molding member, which corresponds to a “molding region” in the mold during insert injection molding.

Figure 5:
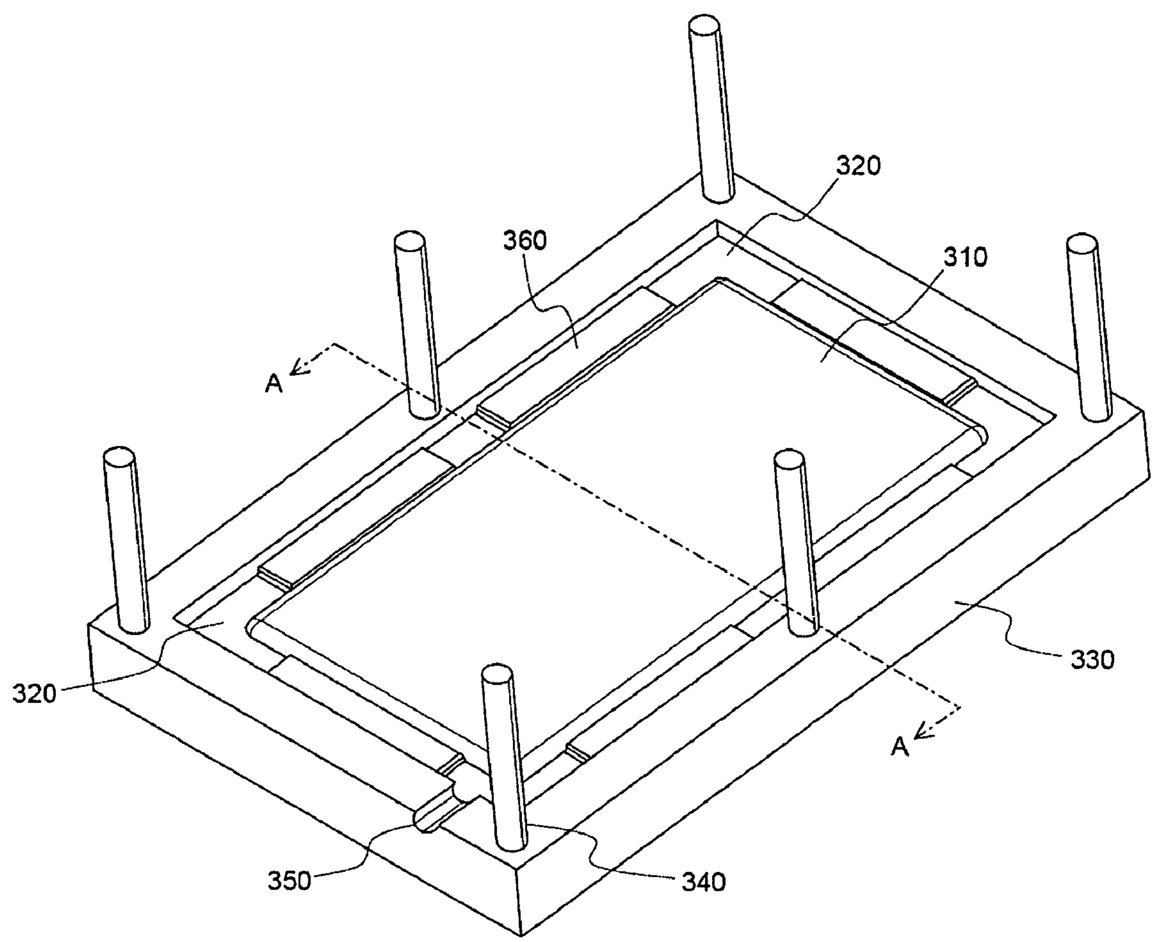
FIGS. 5 and 6 are perspective views respectively illustrating an upper mold and a lower mold constituting an apparatus for manufacturing a secondary battery according to a preferred embodiment of the present invention.
Figure 6:
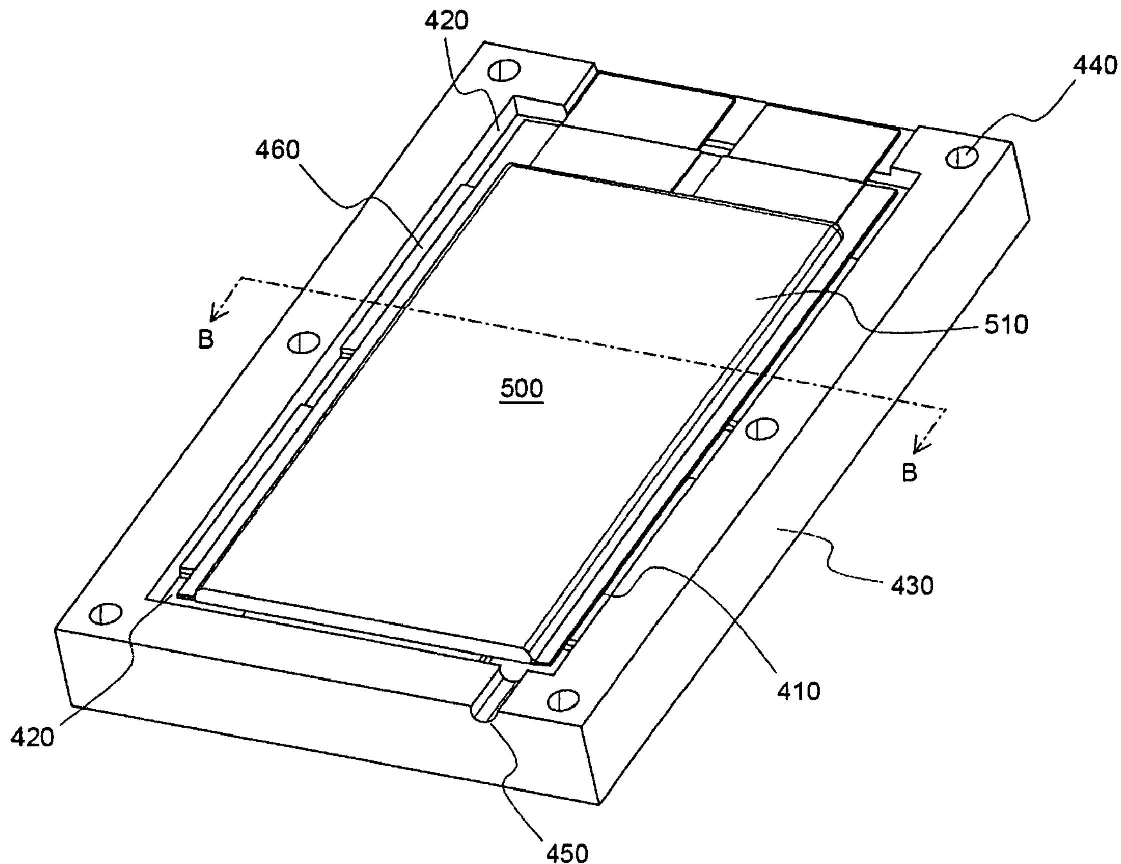

FIGS. 5 and 6 are perspective views respectively illustrating an upper mold and a lower mold constituting an apparatus for manufacturing a secondary battery according to a preferred embodiment of the present invention. For convenience of understanding, the lower mold is shown in FIG. 6 while a battery cell is mounted in the lower mold. Also, the molds shown in FIGS. 5 and 6 are constructed basically to manufacture the secondary battery shown in FIG. 4. For convenience of understanding, however, a battery cell having electrode leads formed at the upper end thereof is used in this embodiment.

Referring to these drawings, the mold, which is provided for manufacturing the secondary battery, comprises a pair of upper and lower molds 300 and 400, which can be coupled to each other and separated from each other. At the inside surfaces of the upper and lower molds 300 and 400 are formed shapes corresponding to the outer surface of the battery cell 500. At the centers of the inside surfaces of the upper and lower molds 300 and 400 are formed elastic members 310 and 410 for supporting the cell body 510 of the battery cell 500, respectively.

The side molding parts 200, 201, and 202 and the upper end and lower end molding parts 212 and 222 shown in FIGS. 2 to 4 are formed by injecting a material for insert injection molding (e.g., a molten material) into molding regions 320 and 420 deeply formed in the inside surfaces of the upper and lower molds 300 and 400.

During the insert injection molding, the upper and lower molds 300 and 400 are separated from and tightly coupled to each other while guide bars 340 formed at a frame 330 of the upper mold 300 are engaged in guide holes formed at a frame 430 of the lower mold 400. While the upper and lower molds 300 and 400 are tightly coupled to each other, a molten resin is injected into the upper and lower molds 300 and 400 through injection ports 350 and 450 formed at one side of the upper mold 300 and at one side of the lower mold 400, respectively.

At the molding regions 320 and 420 are formed pluralities of protrusions 360 and 460, which have a height less than that of the elastic members 310 and 410. The protrusions 360 and 460 form the depressions 232 shown in FIG. 4.

Figure 7:
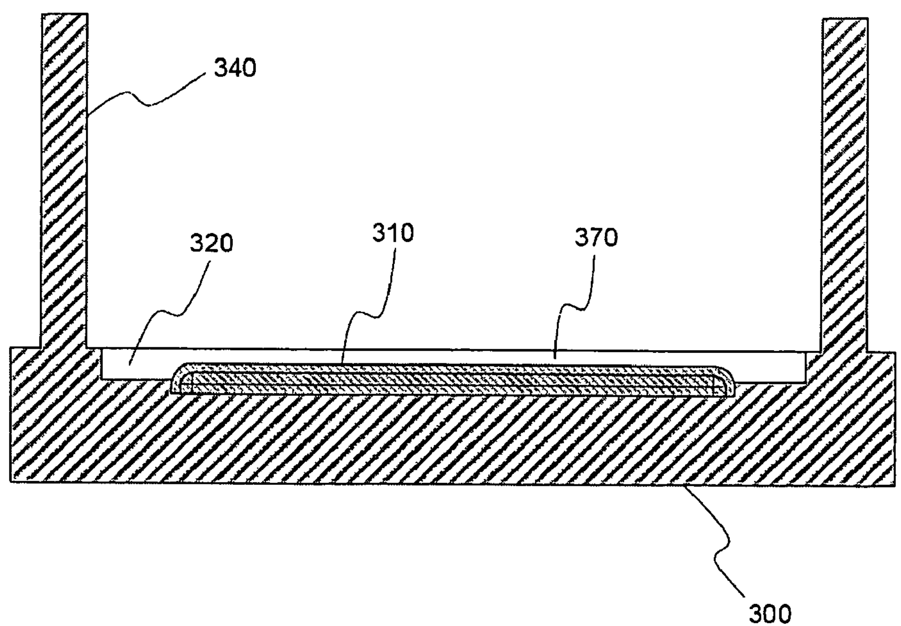
FIG. 7 is a vertical sectional view taken along line A-A of FIG. 5.
Figure 8:
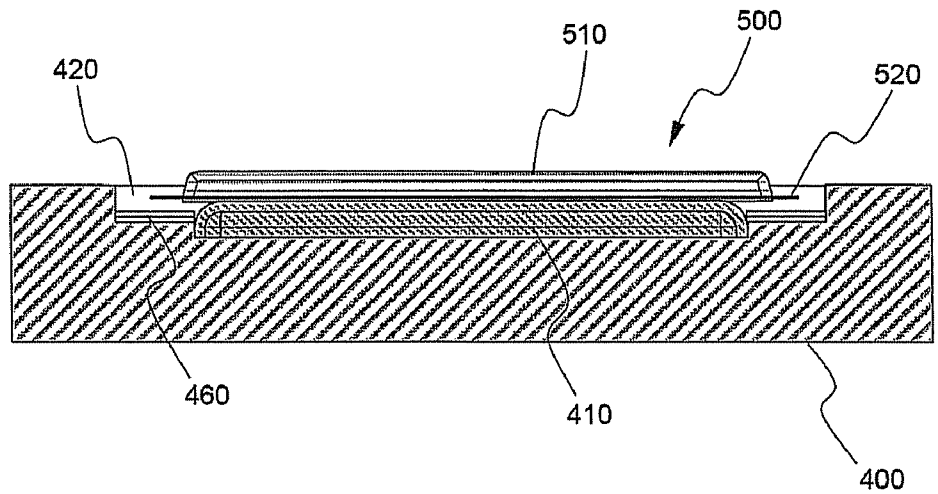
FIG. 8 is a vertical sectional view taken along line B-B of FIG. 6.

FIG. 7 is a vertical sectional view taken along line A-A of FIG. 5, and FIG. 8 is a vertical sectional view taken along line B-B of FIG. 6.

Referring to FIG. 7, the elastic member 310 is formed at the center of the inside surface of the upper mold 300, from which the guide bars 340 protrude upward, such that the elastic member 310 has a predetermined height. A battery cell (not shown) comes into contact with the upper end surface of the elastic member 310. Consequently, the upper end surface of the elastic member 310 forms a non-molding region 370, and the opposite side adjacent regions of the elastic member 310, with which the battery cell does not come into contact, form the molding region 320.

Referring to FIG. 8, the elastic member 410 is formed at the center of the inside surface of the lower mold 400 such that the elastic member 410 has a predetermined height in the same manner as in FIG. 7, and the battery cell 500 is mounted on the upper end surface of the elastic member 410. The contact region of the cell body 510 is isolated from the molding region 420 at the opposite side adjacent regions of the elastic member 410 by the elastic member 410 while the cell body 510 of the battery cell 500 is supported by the elastic member 410. The opposite side sealing regions 520 of the battery cell 500 are exposed from the molding region 420. Consequently, a molten material is injected into the molding region 420 during the insert injection molding, and is then solidified to form the side molding part 202 as shown in FIG. 4. On the other hand, the depressions 232 as shown in FIG. 4 are formed by the projections 460 extending to the predetermined height from the molding region 420.

Figure 9:
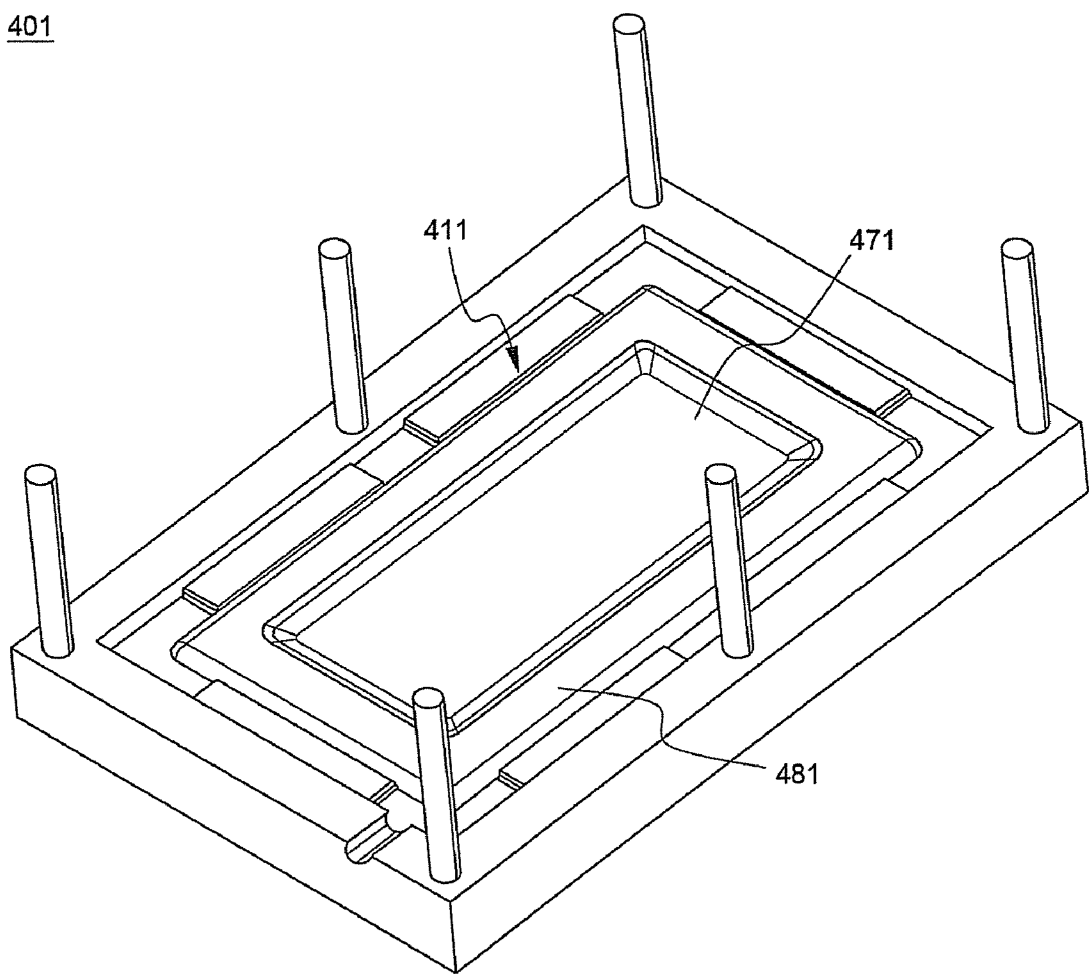
FIG. 9 is a perspective view illustrating a lower mold having another structure, which is a modification of the lower mold shown in FIG. 6.

FIG. 9 is a perspective view typically illustrating a lower mold having another structure, which is a modification of the lower mold shown in FIG. 6.

The lower mold 401 shown in FIG. 9 is different from the lower mold 400 shown in FIG. 6 in that the center region of an elastic member 411 formed at the inside surface of the lower mold 401 is constructed in a depression structure. Specifically, only the outer circumferential region of the elastic member 411 protrudes upward, and therefore, the elastic member 411 supports a battery cell (not shown) while only the protruding outer circumferential region 481 of the elastic member 411 is in contact with the cell body of the battery cell. However, the protruding outer circumferential region 481 of the elastic member 411 is constructed to form a closed curved surface. Consequently, injection of molten resin into a non-molding region 471 of the lower mold 401 is prevented.

As described above, the secondary battery manufacturing device can be constructed in various structures according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention provides an apparatus for manufacturing a secondary battery that is capable of preventing a battery case from being damaged due to the contact between the battery case and a mold when the mold is brought into tight contact with the cell body of a battery cell during insert injection molding to form a molding member at a specific region of the secondary battery, and effectively preventing a material for insert injection molding, which is injected into a molding region, from being injected into a non-molding region.

What is claimed is:

1. An apparatus for manufacturing a secondary battery by performing insert injection molding with respect to a portion of a battery cell while the battery cell is located in a mold, wherein the apparatus comprises a pair of upper and lower molds, at which are formed shapes corresponding to the battery cell, the upper and lower molds are provided at the inside surfaces thereof with elastic members, and the elastic members are constructed in a structure in which the elastic members support a cell body of the battery cell and isolate a non-molding region from a molding region while the battery cell is mounted in the upper and lower molds, wherein the molding region is an outside sealing region of a battery case; and wherein at the molding regions are formed a plurality of protrusions for forming depressions at the outside sealing region of the battery case, with the plurality of protrusions having a height less than a height of the elastic members.

2. The apparatus according to claim 1, wherein the elastic members are formed at the entirety of the non-molding region, or formed along the outer circumference surface of the non-molding region, with which the molding region is in contact.

3. The apparatus according to claim 1, wherein the elastic members are covered with an inactive protection film for protecting the elastic members from a material for insert injection molding.

* * * * *